United States Patent Office 3,721,624
Patented Mar. 20, 1973

3,721,624
PROCESS FOR TREATING WASTE EFFLUENT
Richard Fisch and Norman Newman, St. Paul, Minn., assignors to Minnesota Mining and Manufacturing Company, St. Paul, Minn.
No Drawing. Filed Nov. 26, 1971, Ser. No. 202,544
Int. Cl. C02c 5/04
U.S. Cl. 210—47         4 Claims

ABSTRACT OF THE DISCLOSURE

A process for reducing the pollution level of spent color photographic processing solutions from a process including a thiosulfate-containing fix solution and a phenylene diamine-containing color developer solution, which process comprises adding an oxidizing agent to said spent fix solution to oxidize thiosulfate to sulfate, then adding said oxidized fix solution to said spent color developer solution, thereby insolubilizing said phenylene diamine and forming a sludge, and removing said sludge from said solution.

---

This invention relates to a process for treating spent photographic processing solutions to reduce their biological oxygen demand and toxicity and permit their disposal with minimal pollution of the environment.

Treatment of sewage and industrial waste products is assuming increasing importance in those societies concerned with preservation of the environment and reducing pollution damage to lakes and streams. Many of the waste products contain chemical compounds which are oxidizable and hence serve to reduce oxygen available to marine life. The oxidation of such compounds can be effected with oxygen, as in U.S. 2,809,933, or with an oxygen liberating compound such as the hydroperoxide of U.S. 2,576,442.

The disposal of spent photographic processing baths can introduce harmful and polluting chemicals into the lakes and streams. In recent years color photographic processing has used bleach-fix, hypo or fix baths containing large quantities of thiosulfate (a reducing agent) and color developers containing phenylene diamine compounds as well as hydroquinone, ascorbic acid, hydroxylamine, hydrazine, benzyl alcohol and/or other organic compounds. Stabilizer baths may contain formaldehyde, acetic or citric acid, and other compounds. Wash and other processing baths also tend to include such materials, depending on their location in the photographic processing sequence.

It is an object of this invention to provide a simple, efficient and economical process for treating spent solutions from color photographic processing to lower their oxygen demand and/or toxicity.

In accordance with this invention the spent fix (including bleach-fix) solution from color photographic processing, such as may be used in processing color print paper, is oxidized by treatment with an oxidizing agent and is then combined with spent phenylene diamine color developer solution to form a precipitate or sludge which is separated from the combined solutions, thereby lowering the biological oxygen demand and the organic content of said combined solutions. By following this sequence, the thiosulfate hypo or fixing agent is reduced to sulfate, and the excess amounts of sulfate then serve to form the insoluble amine salt with the phenylene diamine color developer, which precipitates and can readily be separated from the remaining solution by conventional means, such as filtration. The efficiency of the sequential process is achieved by using the byproduct of thiosulfate oxidation to insolubilize the toxic phenylene diamine color developers.

Although any suitable oxidizing agent can be used to oxidize the thiosulfate fix solution, the peroxy compounds are preferred because of the relatively nonpolluting nature of their degradation products. In particular, hydrogen peroxide is not only an effective oxidizing agent but also decomposes to form water.

In practicing the above process, various operating conditions can be utilized. For the peroxide oxidation step it is important, however, to use sufficient peroxide to oxidize at least a major portion of the thiosulfate in the fix bath to the corresponding sulfate, since the sulfate ion excess is subsequently needed for precipitation of the phenylene diamine type color developer. Other components of the fix bath may also be decomposed or precipitated by the peroxide addition, depending on the makeup of the fix solution, which further assists in reducing the biological oxygen demand and/or pollution level of the final effluent. Furthermore, the color developer baths contain other components which can be occluded with the sludge formed by the precipitation of the phenylene diamine color developer. Although any excess peroxide from the first step will tend to oxidize organic materials in the color developer, it is a particular advantage of this invention to minimize the amount of oxidizing agent required in the process by using the sulfate generated in the first step to precipitate the spent color developer in the second step.

The following examples are presented to illustrate the practice of this invention.

EXAMPLE 1

To 50 milliliters of the bleach-fix effluent from a color print paper processing line was added 40 milliliters of a 15 weight percent solution of hydrogen peroxide. After thorough mixing had occurred, 100 milliliters of the effluent from a color developer containing a phenylene diamine color developer, specifically 4-amino-3-methyl-N-ethyl-N(beta-methane sulfonamido)ethyl aniline ("CD-3," a product of Eastman Kodak Co.), was added with mixing. A precipitate formed and was removed by filtration. The resulting effluent had a considerably lower oxygen demand than the original bleach-fix effluent and a substantial amount of the organic matter was removed in the precipitation step.

EXAMPLE 2

The process of Example 1 was repeated with the substitution of potassium peroxydisulfate for the hydrogen peroxide. Similar results were achieved, the resulting precipitate appearing to be somewhat more crystalline than the precipitate in Example 1.

What is claimed is:
1. A process for reducing the pollution level of spent color photographic processing solutions from a process including a thiosulfate-containing fix solution and a phenylene diamine-containing color developer solution, which process comprises adding an oxidizing agent to said spent fix solution to oxidize thiosulfate to sulfate, then adding said oxidized fix solution to said spent color developer solution, thereby insolubilizing said phenylene diamine and forming a sludge, and removing said sludge from said solution.

2. The process of claim 1 in which said oxidizing agent is a peroxy compound.

3. The process of claim 1 in which said oxidizing agent is hydrogen peroxide.

4. The process of claim 1 in which said oxidizing agent is a peroxydisulfate.

References Cited

UNITED STATES PATENTS

| | | | |
|---|---|---|---|
| 3,335,004 | 8/1967 | Wrisley et al. | 96—61 X |
| 3,502,577 | 3/1970 | Hutchins et al. | 210—59 |

MICHAEL ROGERS, Primary Examiner

U.S. Cl. X.R.

96—55, 61; 210—50